United States Patent

[11] 3,590,968

| | | | | |
|---|---|---|---|---|
| [72] | Inventor | Richard Binder<br>Schweinfurt am Main, Germany | | |
| [21] | Appl. No. | 826,948 | | |
| [22] | Filed | May 22, 1969 | | |
| [45] | Patented | July 6, 1971 | | |
| [73] | Assignee | Fichtel & Sachs AG<br>Schweinfurt am Main, Germany | | |
| [32] | Priority | May 25, 1968 | | |
| [33] | | Germany | | |
| [31] | | P 17 50 689.7 | | |

[54] RELEASE MECHANISM IN A FRICTION CLUTCH
10 Claims, 4 Drawing Figs.

[52] U.S. Cl. .................................................. 192/99 A,
192/70.3, 192/48.8
[51] Int. Cl. ........................................................ F16d 21/06
[50] Field of Search ........................................... 192/99 A,
70.29, 70.3

[56] References Cited
UNITED STATES PATENTS
| | | | |
|---|---|---|---|
| 1,513,203 | 10/1924 | Wemp ........................... | 192/99 A X |
| 2,583,621 | 1/1952 | Zeidler ......................... | 192/99 A |
| 3,216,545 | 11/1965 | Schroter ...................... | 192/70.3 X |

Primary Examiner—Benjamin W. Wyche
Attorney—Low and Berman

ABSTRACT: Movement of each clutch release lever mounted on the casing of a friction clutch is transmitted to the pressure plate of the clutch by a motion transmitting train which includes an axially elongated pin interposed between the associated lever and the pressure plate between two knife-edge bearings. Each bearing consists of a frustoconical recess in one of the connected members and a bearing pin on the other member. The convexly arcuate edge about the circular end face of the pin is the knife edge of the bearing, which engages the concavely arcuate intersection between the frustoconical wall and the bottom wall of the recess.

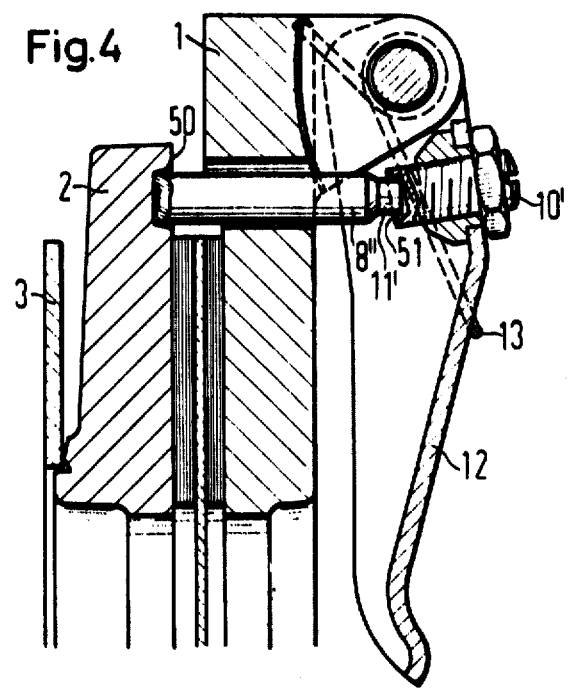
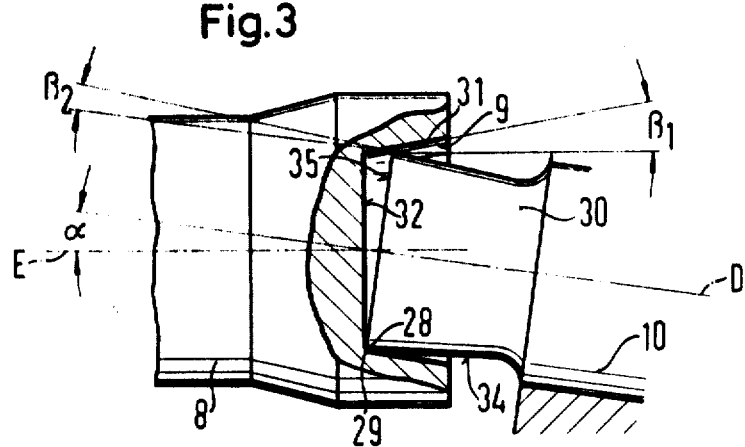

RELEASE MECHANISM IN A FRICTION CLUTCH

BACKGROUND OF THE INVENTION

This invention relates to friction clutches of the kind commonly employed in motor vehicles, and is more specifically concerned with an improvement in the clutch release mechanism.

It is known to provide clutches, particular dual-disc clutches, with clutch release levers mounted on the clutch casing, and each connected with the pressure plate by a motion transmitting train which moves the casing and the pressure plate apart for releasing a driven clutch disc normally frictionally engaged by the casing and the plate under the pressure of a heavy spring.

It is a common drawback of the known clutches of the type described that the friction in the motion transmitting trains is high enough to make the known clutches difficult to disengage and even to interfere with clutch operation under unfavorable conditions.

The object of the invention is the provision of a clutch equipped with a release mechanism of the general type described which can be operated without having to overcome much frictional resistance in motion transmitting trains, yet is simple and compact, and does not enlarge the space occupied by the clutch.

SUMMARY OF THE INVENTION

Friction in the motion transmitting train of the invention is sharply reduced by the use of knife edge bearings between a pin member in each train and the associated lever or the pressure plate or both, the term knife edge bearing being used broadly to designate a bearing arrangement in which a knife edge on a first bearing member is abuttingly received by a face portion of a second bearing member.

In their more specific aspects, the knife edge bearings of the invention have a convexly arcuate knife edge and a concavely arcuate cooperating face portion, the arcs of curvature being preferably circular and of closely similar radii. The first bearing member preferably is symmetrical relative to an axis of symmetry and the second bearing member is formed with a recess having its own axis of symmetry and receiving a portion of the first bearing member in such a manner that both the knife edge and the face portion are located in the recess.

Typically, the recess may have a frustoconically tapering axial wall intersecting the bottom wall in such a manner that the intersection of the walls constitutes the concavely arcuate face portion of the second bearing member. Similarly, the knife edge may be formed by the intersection of an axial wall and a free end wall on the first bearing member, the axial wall being cylindrical or tapering conically in an axial direction away from the end wall.

Other features, additional objects, and many of the attendant advantages of this invention will readily become apparent from the following detailed description of preferred embodiments when considered in connection with the appended drawing.

BRIEF DESCRIPTION OF THE DRAWING

In the drawing:

FIG. 3 shows a clutch closely similar to that of FIG. 1 in fragmentary, greatly enlarged, axial section;

FIG. 4 illustrates yet another single-disc clutch of the invention in a fragmentary view corresponding to that of FIG. 2.

DETAILED DESCRIPTION OF THE DRAWING

Figure 1:
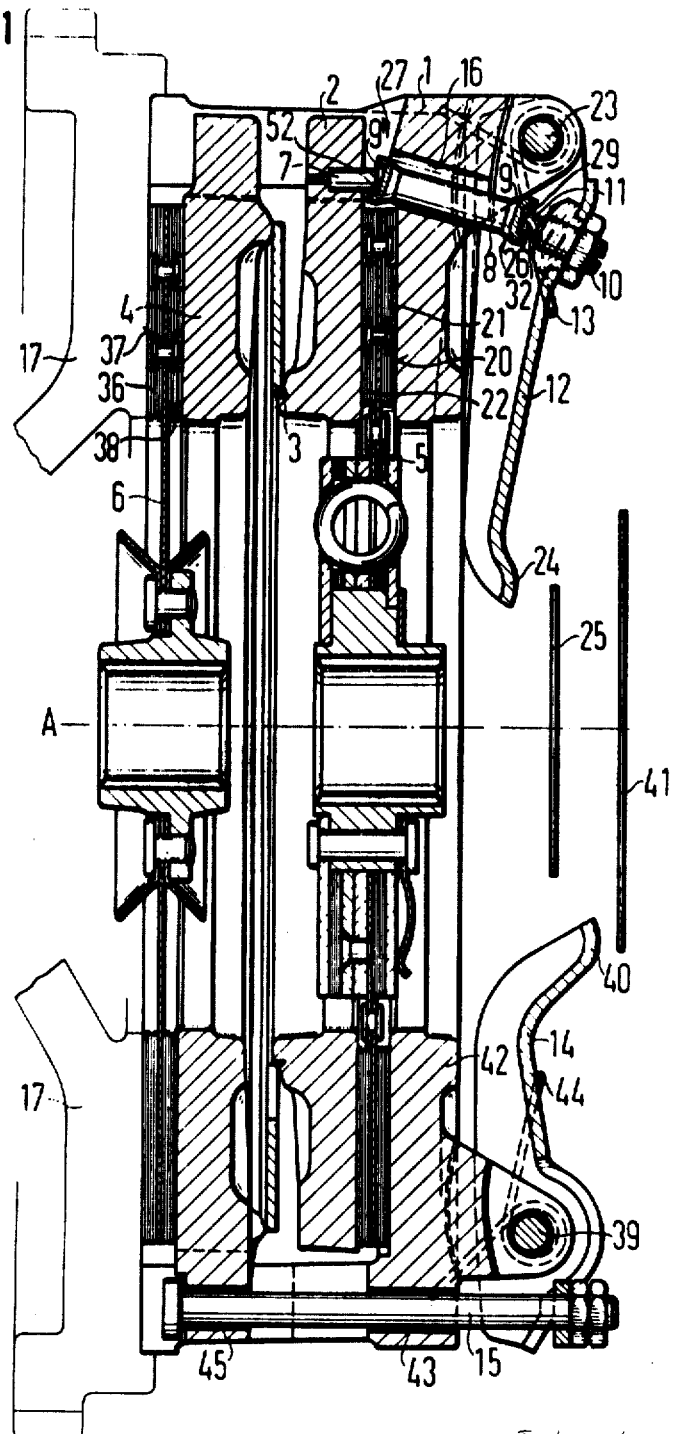
FIG. 1 shows a dual-disc clutch of the invention in axial section.

Referring initially to FIG. 1, there is seen a friction clutch whose driving elements are a casing 1, a first pressure plate 2, a second pressure plate 4, and a flywheel 17 which are connected in a conventional manner, not shown in detail, so that the casing 1 is fixed to the flywheel 17, and the pressure plates 2,4 must rotate jointly with the casing 1, but may move axially.

The driven elements are two clutch discs 5,6 whose hubs are normally splined to respective end portions of two coaxial shafts, not themselves shown in the drawing. A diaphragm spring 3 is axially interposed between the two pressure plates 2,4 to press the plates in opposite axial directions against the driven discs. Annular friction facings 21,22 on the disc 5 thus normally engage respective radial contact faces 20 of the casing 1 and of the pressure plate 2, and friction facings 36,38 on the disc 6 engage opposite contact faces 37 on the pressure plate 4 and the flywheel 17. In the illustrated condition, the driving and driven clutch elements jointly rotate about the common axis A.

This invention is more specifically concerned with mechanism for selectively releasing the discs 5,6 from their driving connection with the flywheel 17 and casing 1. Oversized bores 16 distributed over the circumference of the radial end plate 42 of the casing 1 receive cylindrical pins 8 for movement in a predominantly axial direction. A one-armed clutch release lever 12 associated with each pin 8 is mounted on the end plate 42 by means of a pin 23 for pivoting movement about an axis which is tangential to a circle about the axis A, the circle being common to all pins 23, only one lever 12 and associated structure being shown, but three or more levers being provided as is conventional. A torsion spring 13 normally holds the lever 12 in the illustrated position in which abutting engagement of the lever and of the casing 1 prevents further counterclockwise lever movement, as viewed in FIG. 1.

The lever 12 may be pivoted clockwise against the restraint of the spring 13 by a clutch release element 25 which engages the free end 24 of the lever 12 when moved axially toward the left from the illustrated position as is conventional in itself. During movement of the lever 12, compressive stresses are transmitted to the pressure plate 2 by the pin 8 and two knife edge bearings 26, 27 interposed between the pin and respectively the lever 12 and the plate 2 on opposite sides of the disc 5.

The bearing 26 includes a screw 10 transversely adjustable on the lever 12 and normally fixed by a locking nut. The screw terminates in a smoothly cylindrical bearing pin 11 of reduced diameter whose free end is received in a frustoconically tapering recess 9 of an enlarged terminal head on the pin 8, the bottom face of the recess 9 being directed toward the pin 11 and away from the bearing 27. A similar recess 9' at the other end of the pin 8 receives the free end of a smooth cylindrical pin 7 axially projecting from a blind bore of the pressure plate 2.

When the lever 12 is swung clockwise, as seen in FIG. 1, the convexly circular knife edges about the free end faces of the pins 10,7 engage concave surface portions of the pin 8 in the recesses 9,9' to form two universal joints as will be described in more detail with reference to FIGS. 2 to 4, and to release the disc 5.

Another set of two-armed clutch release levers 14, shorter than the levers 12, is mounted on the end plate 42 of the casing 1 by corresponding pivot pins 39 and biased clockwise, as viewed in FIG. 1, by a torsion spring 44. The free ends 40 of the longer arms on the levers 14 are axially aligned with a second, axially movable clutch release element 41.

Bores 43,45 in the end plate 42 and the pressure plate 4 are axially aligned with each other and the short arm of each lever 14 and slidably receive a tie bolt 15. The head at one end of the bolt abuts against the contact face of the plate 4, and nuts on the other end of the bolt are engaged by the lever 14 to pull the plate 4 away from the flywheel 17 against the restraint of the diaphragm spring 3 when the levers 14 are pivoted counterclockwise, as viewed in FIG. 1, by the clutch release element 41. Suitable actuating mechanism for the release elements 25,41, not illustrated, thus permits the discs 5,6 and the associated respective shafts to be released from their driving connection with the flywheel 17 either individually or simultaneously Modified knife edge bearings for use in the clutch more fully illustrated in FIG. 1 or in similar single-disc or dual-disc clutches are shown in FIGS. 2 to 4

Figure 2:
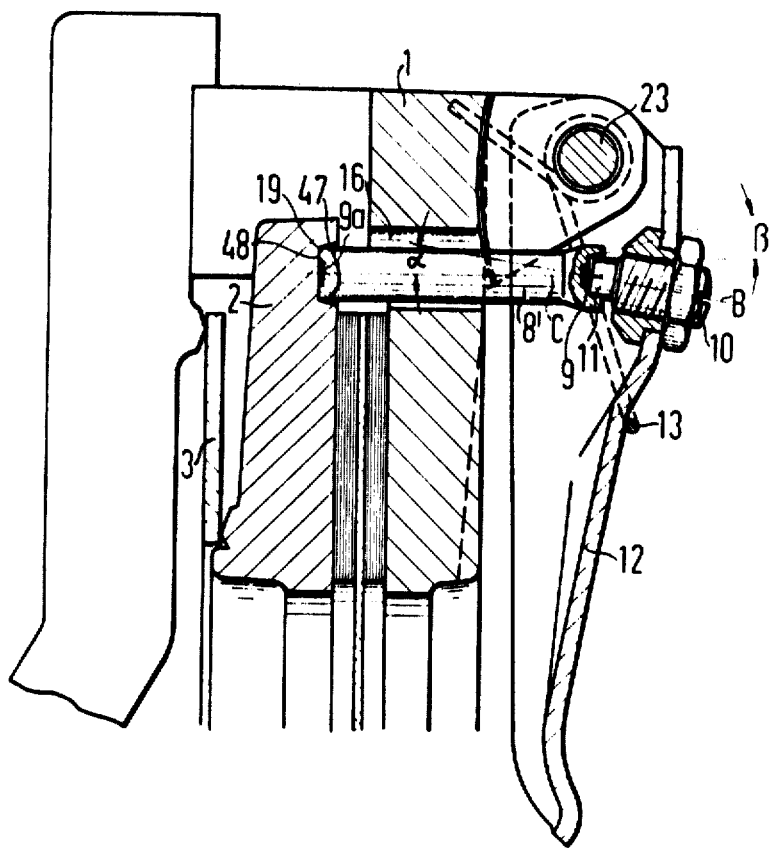
FIG. 2 shows a single-disc clutch in a fragmentary, axially sectional view.

The clutch illustrated in FIG. 2 is of the single-disc-type and its only pressure plate 2 is normally held in the engaging position by a diaphragm spring 3 which urges the plate away from the flyweight 17 and toward the casing 1. Only one of the several clutch release levers 12 is seen and carries an adjusting screw 10 whose cylindrical end portion 11 engages a recess in a cylindrical pin 8' when the lever is pivoted against the restraint of its spring 13, as described with reference to FIG. 1.

The inner end 49 of the pin 8' is cylindrical and is partly received in a recess 9a of the pressure plate 2. The recess is frustoconical about the axis C of the pin 8' which is parallel to the axis of rotation of the clutch, not itself seen in FIG. 2. The axial wall 47 of the recess 9a tapers inwardly of the recess and intersects the flat bottom wall 48 of the recess in a circle which is slightly greater than the circumference of the end face on the pin portion 49. The pin 8' is therefore capable of universal movement within the recess 9a.

The longitudinal axis of the screw 10 is inclined relative to the axis B in an angle $\alpha$ which must not become greater than one half of the apex angle $2\beta$ of the associated frustoconical recess 9 in any operative position of the lever 12 if only a portion of the convex knife edge on the screw 10 is to make point contact or limited line contact with the frustoconical concave wall of the recess 9 as will be described more fully with reference to FIG. 3.

The knife edge bearing shown in FIG. 3 is identical with the bearing 26 in FIG. 1 except for a modified configuration of the free end portion 30 of the adjusting screw 10.

The recess 9 has an axial wall 31 which flares conically toward the open end of the recess, and a bottom wall 32 which is shown to be flat and perpendicular to the axis E of the conical surface but need neither be flat nor perpendicular to the axis to achieve the desired result. The intersection 29 between the walls 31,32 presents a circular, concave face to the circular edge 28 formed on the free end portion 30 by the intersection of a radial end face 35 and an axial wall 34 which tapers conically from the end face 35 toward the threaded portion of the screw 10. In the apparatus of FIG. 1, a cylindrical wall replaces the conical wall 34 shown in FIG. 3.

There is some angular displacement between the axis D of the screw 10 and the axis E of the pin 8 during clutch engagement and disengagement. However, the angle $\alpha$ between the axes is never reduced to zero, and the edge 28 whose radius of curvature is equal to or slightly smaller than that of the concave circular face 29 makes pressure transmitting contact with the latter only in a point if all materials of construction may be assumed to be perfectly rigid. Because of the unavoidable slight resiliency of the steel or other metal employed, there is contact along a short circumferential line. The bearing has the characteristics of a knife edge bearing. The engagement between the two bearing members is similar or identical at both ends of the pin 8 or of its equivalents in all illustrated embodiments of the invention.

The apex angle of the conical wall 31 must be selected so as to avoid contact between the wall and the axial surface of the cooperating male member 30. Under otherwise identical conditions, the apex angle $2\beta_1$ of the wall 31 may be smaller in the arrangement of FIG. 3 than the corresponding angle in the device of FIG. 1 by the value $2\beta_2$ of the apex angle of the wall 34 on the screw portion 30, and the bearing operates in the desired manner as long as the relationship $\beta_1+\beta_2\geq\alpha$ is maintained, $\alpha$ being the angle enclosed by the axes D,E.

The clutch partly shown in FIG. 4 is identical with that described with reference to FIG. 2 except for the knife edge bearings at the two ends of the pressure and motion transmitting pin 8''. The pin is of stepped cylindrical shape. Its reduced outer end portion 11' is received in a frustoconical recess 51 in the radial end face of the adjusting screw 10' which determines the operative position of the clutch release lever 12. The inner end of the pin 8'' is received in a frustoconical recess 50 of the pressure plate 2.

Regardless of the aforedescribed structural differences, the several clutch release mechanisms of the invention are distinguished by minimal friction in the motion transmitting train between the clutch release levers and the pressure plate. The force required for disengaging the clutches is low, and they promptly and reliably engage when the disengaging pressure is relaxed.

What I claim is:

1. In a friction clutch including a first driving element (1) and a second driving element (2) mounted for joint rotation about a common axis (A) and axially movable toward and away from each other, a driven disc (5) axially interposed between said driving elements, yieldably resilient means (3) urging one of said elements axially toward the other element for frictional driving engagement of said driven disc with said elements, a plurality of clutch-releasing lever members (12), a plurality of pivot means (23) respectively securing said lever members to said first element in circumferentially spaced relationship for pivoting movement about respective pivot axes, each pivot axis being substantially tangential relative to a circle about said axis of rotation, clutch releasing means (25) engageable with said lever members for pivoting the same, and motion transmitting means operatively interposed between said lever members and said second element and responsive to said pivoting of said lever members for moving said elements apart against the restraint of said yieldably resilient means and for thereby releasing said driven disc, the improvement in the motion transmitting means which comprises:
   a. a pin member (8) associated with each lever member;
   b. first bearing means (26) interposed between said pin member and the associated lever member for transmitting compressive stresses from said lever member to said pin member; and
   c. second bearing mean (27) interposed between said pin member and said second element for transmitting said compressive stresses from said pin member to said second element,
   1. at least one of said bearing means including a first bearing member having a convexly arcuate knife edge and a second bearing member having a concavely arcuate face portion abuttingly receiving said knife edge,
   2. said bearing members constituting a universal joint between said pin member and the associated driving element.

2. In a clutch as set forth in claim 1, said first bearing means including an adjusting member threadedly movable on said lever member toward and away from said first face of said pin member and engaging the same.

3. In a clutch as set forth in claim 1, said knife edge and said face portion being circularly arcuate, the respective circular arcs having closely similar radii of curvature.

4. In a clutch as set forth in claim 1, said first bearing member being symmetrical relative to an axis of symmetry and said second bearing member being formed with a recess having an axis of symmetry and receiving a portion of said first bearing member, said knife edge and said face portion being located in said recess.

5. In a clutch as set forth in claim 4, said second bearing member having a frustoconically tapering axial wall in said recess and a bottom wall intersecting said axial wall, the intersection of said walls constituting said face portion.

6. In a clutch as set forth in claim 4, said first bearing member having an axial wall and a free end wall intersecting said axial wall, the intersection of said walls constituting said knife edge.

7. In a clutch as set forth in claim 6, said axial wall being cylindrical about the axis of symmetry of said first bearing member.

8. In a clutch as set forth in claim 6, said axial wall tapering conically in an axial direction away from said end wall.

9. In a clutch as set forth in claim 6, said second bearing member having a frustoconically tapering axial wall in said recess and a bottom wall intersecting said axial wall, the intersection of said walls of the second bearing member constituting said face portion.

10. In a clutch as set forth in claim 1, said first bearing means and said second bearing means being offset from said driven disc in opposite axial directions.